United States Patent [19]

Scherer

[11] 4,378,214

[45] Mar. 29, 1983

[54] MULTI-PURPOSE EDUCATIONAL DEVICE

[76] Inventor: Marion W. Scherer, 2901 Seventh Ave., N., St. Petersburg, Fla. 33713

[21] Appl. No.: 343,205

[22] Filed: Jan. 27, 1982

[51] Int. Cl.³ .............................................. G09B 19/00
[52] U.S. Cl. .................................... 434/81; 434/170; 434/205
[58] Field of Search .................. 434/81, 98, 112, 159, 434/167, 170, 172, 205, 207

[56] References Cited

U.S. PATENT DOCUMENTS

| | | | |
|---|---|---|---|
| 1,055,151 | 3/1913 | Emerson | 434/172 X |
| 1,479,423 | 1/1924 | Barton | 434/172 |
| 1,571,488 | 2/1926 | Moisan | 434/170 X |
| 3,172,214 | 3/1965 | Aberge | 434/167 |
| 3,624,686 | 11/1971 | Beals | 434/98 |
| 3,724,101 | 4/1973 | Slezak | 434/170 |

OTHER PUBLICATIONS

"Sorting Box and Accessories", No. 81-430 and Match and Stack, No. 81-425, pp. 70-71 of 1979 Teaching Resources Catalog.

Primary Examiner—Harland S. Skogquist
Attorney, Agent, or Firm—B. P. Fishburne, Jr.

[57] ABSTRACT

A multi-pocketed washable fabric body portion is employed with several selective reversible fabric strips each having fastener components for engagement with mating fastener components on the body portion. The strips carry colors, shapes, alpha-numeric indicia and material textures requiring recognition by a child. Groups of fabric elements having colors, shapes, indicia and textures to match up with the strips are provided, and a child, after sorting the fabric elements, inserts them in the pockets of the body portion which are positioned adjacent to recognized colors, shapes, indicia or textures on the strips.

7 Claims, 11 Drawing Figures

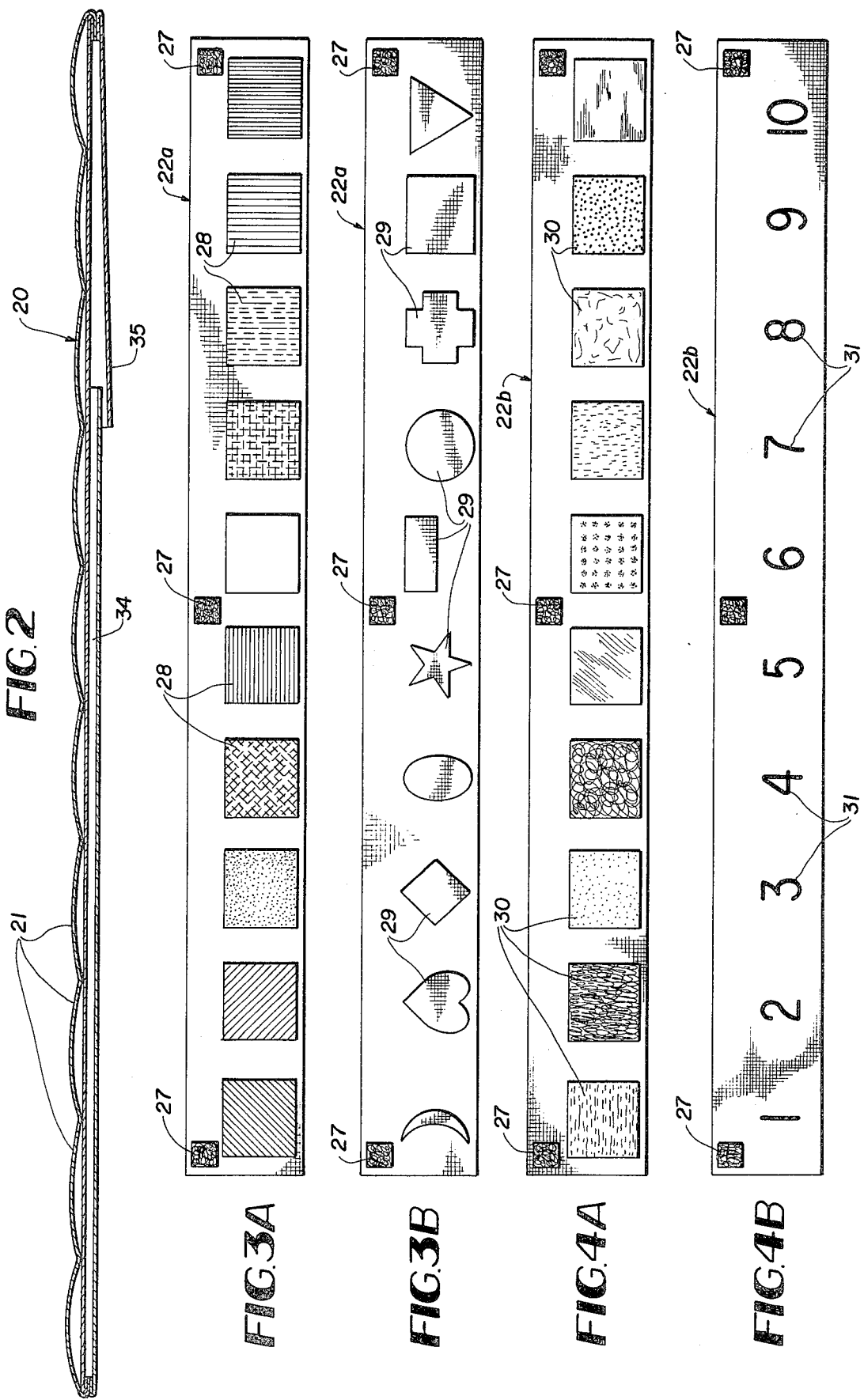

MULTI-PURPOSE EDUCATIONAL DEVICE

BACKGROUND OF THE INVENTION

Various types of educational devices for young children are known in the prior art, including some which are designed to teach the alphabet or numbers and to teach color recognition and the recognition of shapes. Generally, in the prior art, separate teaching devices are employed to accomplish these multiple objectives and many of the devices are mechanical or electromechanical in nature and tend to be somewhat complicated and costly. Many are not practical for the young child to utilize directly and require demonstration or operation by the teacher. Some have an element of danger for the small child in that they include solid elements, such as geometric blocks, which conceivably could be swallowed. Sharp edges are sometimes present on components. Frequently, the prior art teaching devices are difficult to clean and may not be immersed in water or placed in a washing machine.

With the above deficiencies in mind, the objective of the present invention is to provide a highly versatile, simplified and economical multi-purpose educational device for younger children which is entirely safe for them to use and which is essentially constructed of machine washable flexible material of a type which is tough and durable.

The device, after brief introductory instruction by a teacher, enables the young child to recognize colors, shapes, indicia and fabric textures, to sort provided elements thereof from groups, and to insert the sorted elements into pockets formed on the fabric body portion of the device which are aligned with recognition elements contained on the opposite sides of several recognition strips which are selectively attached to the body portion through mating fastener components on the strips and body portion.

Other features and advantages of the invention will become apparent to those skilled in the art during the course of the following detailed description.

BRIEF DESCRIPTION OF THE DRAWINGS

FIG. 2 is an enlarged vertical section through the body portion of the device taken on line 2—2 of FIG. 1.

FIGS. 3A and 3B are opposite side plan views of a first recognition strip employed with the pocketed body portion of the device.

FIGS. 4A and 4B are similar views of a second recognition strip.

DETAILED DESCRIPTION

Figure 1:
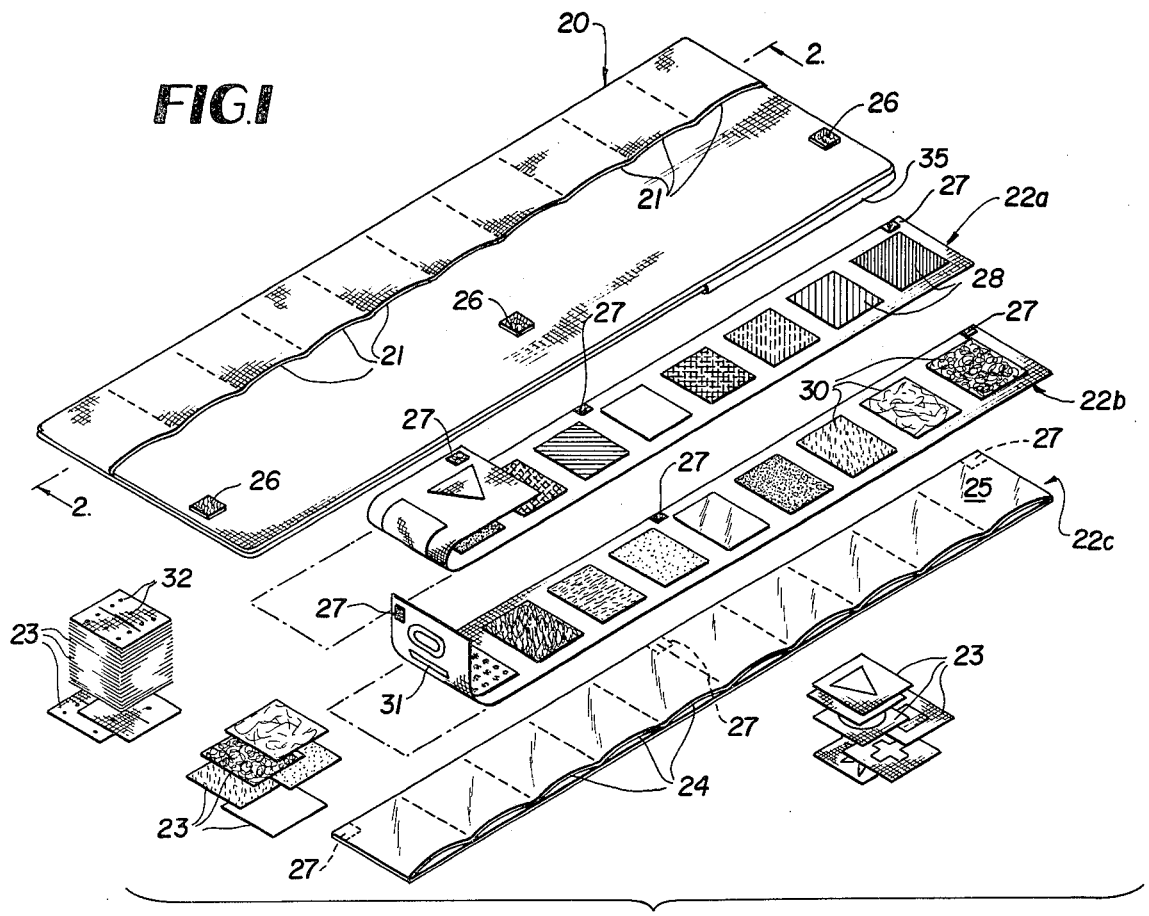
FIG. 1 is an exploded perspective view of a multi-purpose educational device in accordance with the invention.
Figure 5:
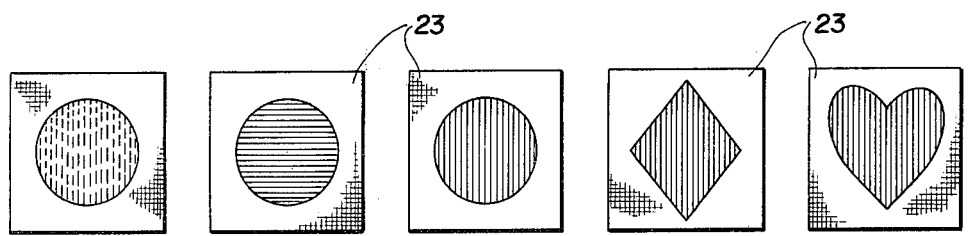
FIG. 5 is a composite view of color and/or shape recognition elements.
Figure 6:
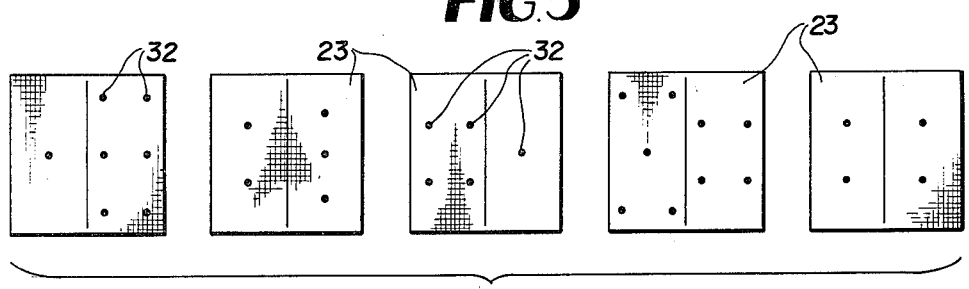
FIG. 6 is a similar view of number recognition elements.

Referring to the drawings in detail wherein like numerals designate like parts, FIG. 1 depicts the basic components of the multi-purpose educational device for children in accordance with the present invention. These components consist of an elongated rectangular body portion 20 preferably formed of machine washable fabric which is durable, such as a polyester-cotton fabric. The body portion 20 includes on one side thereof and along one longitudinal edge a plurality of equal size preferably rectangular pockets 21 whose open ends face inwardly and away from the edge along which the pockets are disposed. The use of these pockets in the device will be fully described.

A plurality, such as three, separately formed elongated flexible recognition strips 22a, 22b and 22c are utilized with the body portion 20 in a manner to be described, along with a large number of flexible preferably square recognition elements 23 of diverse types, yet to be described. The recognition strips and elements are also preferably formed of machine washable fabric except that the strip 22c has multiple pockets 24 of equal size formed therealong corresponding in number and size to the pockets 21 and formed by an attached overlay strip 25 formed of flexible transparent plastics material. The material forming the pockets 21 is opaque fabric. The recognition elements 23 are sized and shaped for convenient insertion into the pockets 21 in the use of the device.

The relative sizes of the described components and their shapes, as well as the specific materials from which they are constructed, may be varied. Also the numbers and types of recognition elements 23 may be varied under the invention.

On its front side carrying the attached pockets 21, the body portion 20 has preferably three fastener components 26, such as Velcro components, fixed thereon near its ends and center and inwardly from the longitudinal edge of the body portion away from the pockets 21. The recognition strips 22a, 22b and 22c which are preferably of about the same length as the body portion 20 have mating Velcro fastener components 27 fixed thereon on both sides thereof adjacent to one edge of the strip. The spacing of the components 27 is such that they can be brought into engagement with the mating components 26 of body portion 20 when each recognition strip in turn is mounted for use on the body portion 20 with a selected side of the strip exposed or viewable and its other side down and concealed. The strip 22c has the Velcro components 27 only on the bottom or fabric side thereof as viewed in FIG. 1 because the strip 22c is employed on the body portion only with its transparent wall 25 uppermost, as will be further described.

The recognition strip 22a has variously colored preferably fabric patches 28 fixed thereon in equidistantly spaced relationship. From end-to-end of strip 22a on one side thereof these color patches 28 which correspond in number to the pockets 21 may include the ten primary colors red, pink, purple, yellow, white, blue, orange, black, green and brown. On its opposite side, FIG. 3B, the strip 22a has fixed thereon in spaced relationship preferably fabric shape-defining elements 29 also corresponding in number to the pockets 21 on body portion 20. The shapes of the elements 29 are common geometric shapes and other well known shapes which it is desirable for a child to recognize at an early age. The selection of shapes on the strip 22a can be varied in the invention and the invention is not limited in any way to those shapes depicted in FIG. 3B. The elements 29 may have a common color contrasting with the color employed for the fabric strip 22a or they may have individually different colors matching the colors of the elements 28 or differing therefrom. In this sense, it can be seen that the invention is highly versatile.

The strip 22b is provided on one side thereof with spaced fabric elements 30 which may be variously colored and which embody various textures of material such as silk, knitted wool, woven wool, velvet, terrycloth, corduroy, worsted, woven cotton cloth and others. The objective is that a child learns to recognize these various textures by feel or touch on a repetitive basis. The types of textures employed on the strip 22b can also be varied under the invention.

The opposite side of the strip 22b, FIG. 4B, carries spaced numeric indicia 31, such as the numerals 1 through 10. Other numerals or other forms of indicia can be employed on the strip 22b if preferred. The elements 30 and numerals 31 also correspond in number and spacing to the pockets 21. Other fabric strips, not shown, carrying other types of recognition elements on one or both sides thereof can be provided in the device. The illustrated arrangement is simply a preferred basic form of the invention.

The previously-mentioned fabric elements 23 are provided in the device in groups of thirty to match up with the various colors, shapes, fabric textures and numeric indicia or other indicia on the strips 22a and 22b. In each group of thirty elements 23, there are three each of the individual colors, shapes, textures and numerals so that the child handling the elements 23 can learn to sort them into sub-groups of three and then match the colors, shapes, textures and numerals in these sub-groups with the matching elements 28, 29, 30 and 31 on the recognition strips.

Figure 7:
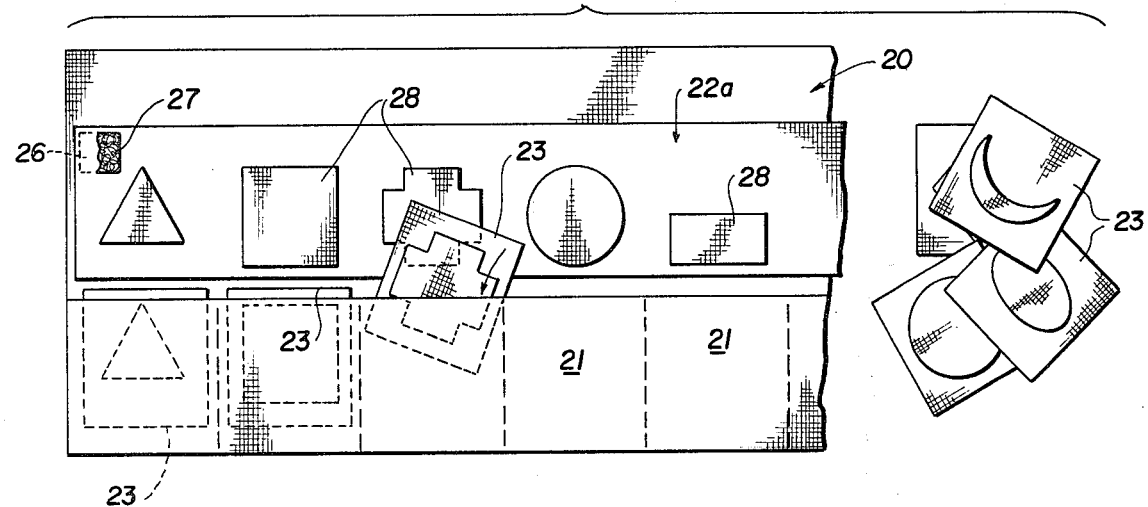
FIG. 7 is a composite plan view depicting one use mode of the device.
Figure 9:
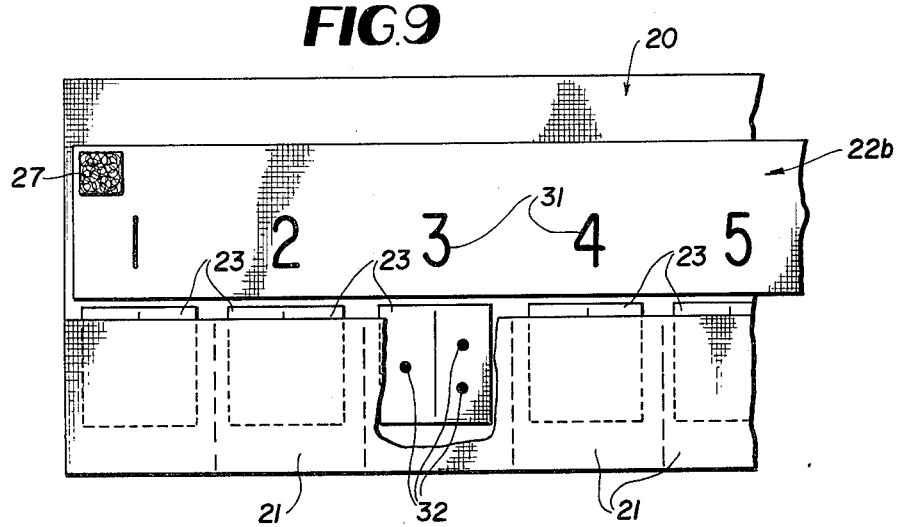
FIG. 9 is a similar view depicting still another use mode.

In using the educational device, the body portion 20 is laid out on a suitable flat surface and one strip at a time is attached to the body portion through engagement of the fastener components 26 and 27 as shown in FIGS. 7 and 9. One side of each mounted strip 22a and 22b is visible to the child and the other side is concealed. The child who has received the "match-up" elements 23 in groups of thirty, as explained, will be given time to sort them into the sub-groups, previously described. After such sorting, the child will attempt to insert into selected pockets 21 of the body portion 20 those individual elements 23, or three such elements if preferred, which match or correspond with the shapes, FIG. 7, or numeric indicia, FIG. 9, on the respective strips 22a and 22b. As noted in FIG. 9, the matching numeric indicia 32 on the elements 23 may be in the form of domino dots instead of arabic numerals. This variation compels the child to count. Roman or arabic numerals may also be employed on the elements 23, if preferred.

Figure 8:
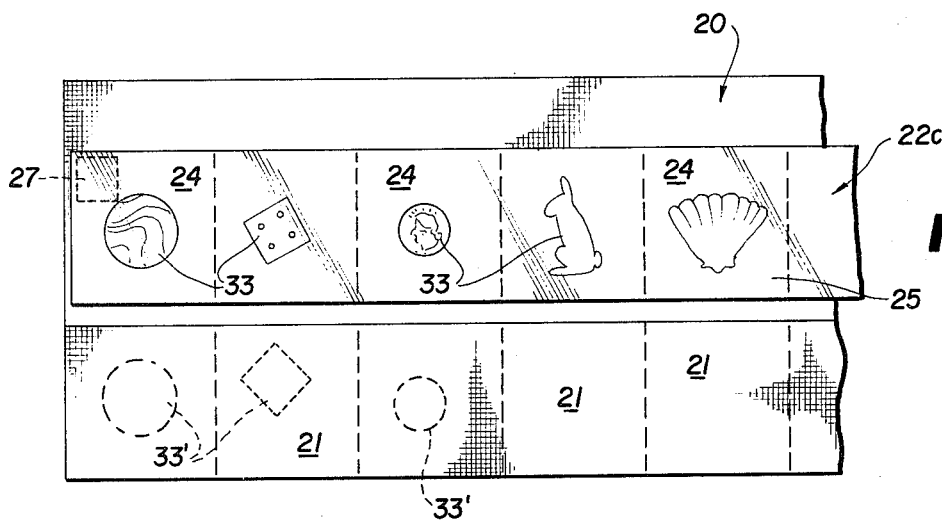
FIG. 8 is a further fragmentary plan view depicting another use mode.

When the child has successfully placed the elements 23 in the correct pockets 21 adjacent to the recognition elements 28 or 31 which they match, the strips 22a and 22b are reversed on the body portion 20 and attached through the fastener components 26 and 27 so that the opposite sides of the strips are exposed to view. In each case, as best shown in FIGS. 7-9, the recognition elements on the interchangeable strips can be aligned with the mouths of the pockets 21 to aid the child in the use of the device. The child proceeds as described previously in the sorting, matching and placement of elements 23 in the proper pockets 21. In the case of the textile elements 30 and corresponding elements 23 exhibiting various textures, as described, the child can make the proper selection based on a combination of feel and sight.

The strip 22c, which the teacher may consider as a "do-it-yourself" versatile strip, a number of interesting uses are possible. This strip is mounted on the body portion 20 as shown in FIG. 8 with its pockets 24 aligned with the pockets 21 and with the transparent sheet 25 uppermost. The teacher may place a variety of objects 33 in the transparent pockets 24 and give the child the opportunity to place matching objects 33' in the pockets 21. These matching objects may also be in the form of additional fabric elements 23 instead of three dimensional objects to enhance the safety of the device.

In lieu of the objects 33, the teacher can use a grease pencil or the like to inscribe on the faces of the pockets 24 any indicia, picture or symbol and the child is asked to recognize this symbol and to show his or her recognition by inserting a matching element into the correct registering pocket 21. Instead of being cloth elements, the elements 23 may be in the form of plastic chips.

The device comprises another convenience feature in that the reverse side of the body portion 20 contains a long storage pocket 34, FIG. 2, extending for a major portion of the length of the body portion. This pocket is large enough to contain all of the match-up elements 23 normally furnished with the device sufficient to accommodate the needs of an average size class. A cover flap 35 for the mouth of pocket 34 is also formed on the reverse side of flexible fabric body portion 20. The several strips 22a, 22b and 22c can also be placed in the pocket 34 and the device can be rolled up into compact form so that the teacher may carry it conveniently in a large purse.

It may be seen that an interesting and versatile educational device for children is provided. The device being formed of fabric in its preferred form is soft and flexible and therefore safe for small children. It is also readily washable and due to the storage pocket can be rolled up into a compact form, as explained. The device is comparatively inexpensive to manufacture, is durable and forms a highly attractive product for use in a school or in the home as a combined educational and entertainment device.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A multi-purpose educational device comprising an elongated body portion formed of flexible sheet material and having a multiplicity of side-by-side pockets formed on one side thereof, plural spaced fastener components fixed to said one side of the body portion in spaced relationship to said pockets, plural elongated strips of lesser width than said body portion and having substantially the same length as the body portion and formed of flexible sheet material, a multiplicity of spaced specifically different recognition elements on each opposite side of each strip corresponding in number and spacing to said pockets, coacting spaced fastener components on each side of each strip adapted to mate with the fastener components on the body portion so that each strip selectively may be releasably attached to the body portion in spaced parallel relationship to the pockets of the body portion with either of its sides exposed to view and its opposite side concealed, and a multiplicity of groups of match-up elements for use by children and being of a size and shape enabling insertion into said pockets and adapted for sorting and matching by children with the recognition elements of said strips.

2. A multi-purpose educational device as defined in claim 1, and said pockets formed along one longitudinal edge of the body portion with their open mouths facing inwardly of such edge, and said spaced fastener components of the body portion being disposed near and inwardly of the other longitudinal edge of the body portion, whereby each comparatively narrow strip can be mounted on the body portion in said spaced parallel relationship to the pockets.

3. A multi-purpose educational device as defined in claim 2, and said body portion, strips, recognition elements on the strips and match-up elements all being formed of fabric.

4. A multi-purpose educational device as defined in claim 3, and said fastener components of the body portion and strips comprising Velcro patches on the body portion and strips.

5. A multi-purpose educational device as defined in claim 1, and another elongated strip formed of flexible sheet material and having on one side thereof a multiplicity of side-by-side transparent pockets corresponding in number and spacing to the pockets of said body portion, and said last-named strip having on the other side thereof spaced fastener components adapted to mate with the fastener components on the body portion.

6. A multi-purpose educational device as defined in claim 5, and the last-named strip being formed of fabric and said pockets being formed by a transparent flexible plastics sheet attached along one longitudinal edge of the strip and being substantially coextensive in length and width to the fabric forming the strip.

7. A multi-purpose educational device as defined in claim 1, and the strips having said recognition elements on the opposite sides thereof in the forms of various colors, shapes, cloth textures and indicia, and said groups of match-up elements comprising matching colors, shapes, cloth textures and indicia.

* * * * *